Dec. 7, 1954   R. J. TRAPPEY   2,696,234
APPARATUS FOR SLICING EDIBLE PRODUCTS
Filed Sept. 6, 1950   3 Sheets-Sheet 1

INVENTOR.
Randolph Joseph Trappey
BY
Watson, Cole, Grindle & Watson
ATTORNEYS.

Dec. 7, 1954  R. J. TRAPPEY  2,696,234
APPARATUS FOR SLICING EDIBLE PRODUCTS
Filed Sept. 6, 1950  3 Sheets-Sheet 2

INVENTOR.
Randolph Joseph Trappey
BY
Watson, Cole, Grindle & Watson
ATTORNEYS.

Dec. 7, 1954   R. J. TRAPPEY   2,696,234
APPARATUS FOR SLICING EDIBLE PRODUCTS
Filed Sept. 6, 1950   3 Sheets-Sheet 3

INVENTOR.
Randolph Joseph Trappey
BY
Watson, Cole, Grindle + Watson
ATTORNEYS.

United States Patent Office 2,696,234
Patented Dec. 7, 1954

2,696,234

APPARATUS FOR SLICING EDIBLE PRODUCTS

Randolph Joseph Trappey, Lafayette, La., assignor, by decree of court, to B. F. Trappey's Sons, Inc., a corporation of Louisiana Application September 6, 1950, Serial No. 183,308

1 Claim. (Cl. 146—81)

This invention relates to improvements in apparatus for trimming or slicing edible products, and more particularly to the trimming of heads, stems and the like from vegetables and fruits.

It is especially desirable, in trimming the heads or stems from vegetables such as okra, preparatory to cooking or canning the same, to provide apparatus capable of slicing off the head or stem in such manner as to avoid the removal of any considerable part of the body or edible portion. Furthermore, since vegetables of a given kind often vary considerably in size and shape, it is desirable to provide apparatus for severing the stems or heads which can readily be accommodated to such variation in size, and which can be adjusted so as to remove various predetermined lengths of the undesired portion of the vegetable, so as to minimize waste.

It is therefore an object of the invention to provide apparatus of the type described in which positive gripping of the edible product is avoided, the product being received and conveyed loosely, whereby widely varying sizes of products can be accommodated. A further object of the invention is the provision of means whereby variation of the depth of trim or cut may readily be adjusted to compensate for products having differing lengths of head or stem.

In the preferred embodiment of my invention, which is especially suited to the trimming and slicing of okra and similar vegetable and fruit products, the products are introduced in a series of containers which are carried through a predetermined path by a conveyor, the containers being generally upright, being open at the top and bottom, and having lateral dimensions such that the product is received loosely therein. Fixed supporting means for the products extends longitudinally of the path through which the containers are moved, and is positioned immediately beneath the latter, for the purpose of retaining the products within the containers, and in such a position that the head or stem of the product depends from and is exposed beneath the container in which it is received. Slicing means, positioned in the path through which the products are thus moved, and beneath the product containers, is positioned to intercept and slice the heads or stems from the products as they are carried along by the conveyor.

These and further objects and features of the invention will be apparent from the following description, taken in connection with the accompanying drawings, in which Figure 1 is a plan view of apparatus embodying the principles of the invention;

For the purpose of explaining the principles of the invention, a single embodiment is illustrated and specific language is employed to describe the same. Nevertheless, it will be understood that no limitation of the scope of the invention is thereby intended, various alterations and further modifications thereof being contemplated.

In the illustrated form of the invention, the apparatus is supported on a frame or table formed by a plurality of vertical structural members or legs 10, and a plurality of transverse and longitudinal structural members 11 rigidly connected to and supported by the legs. The details of the supporting frame may obviously be widely varied, and the arrangement and configuration of the elements thereof form no part of the instant invention, which resides in the novel arrangement of the conveyor and the cutting device.

Figure 1:
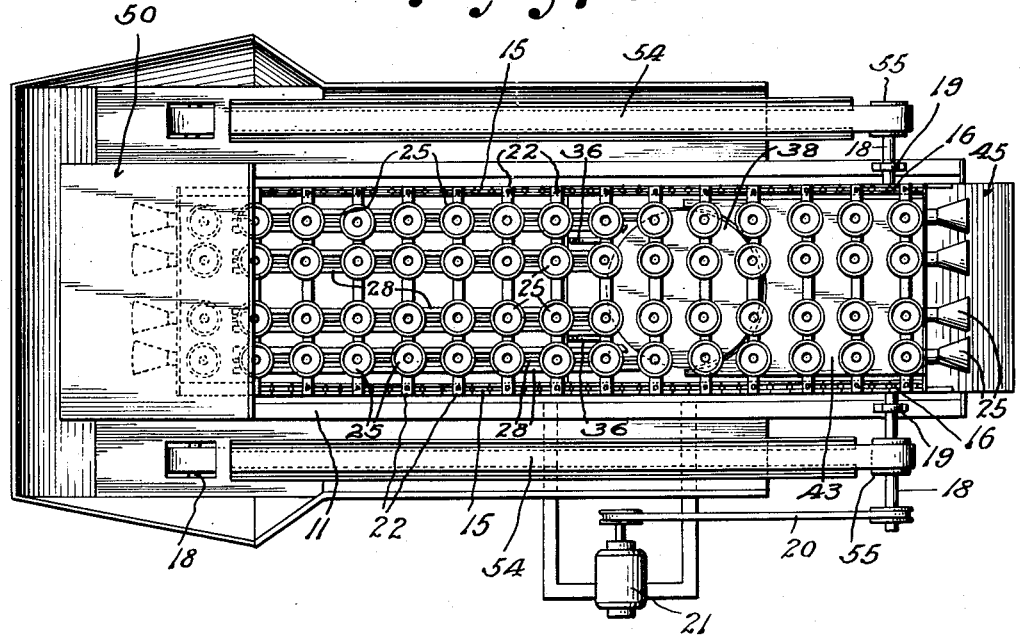
Figure 2:
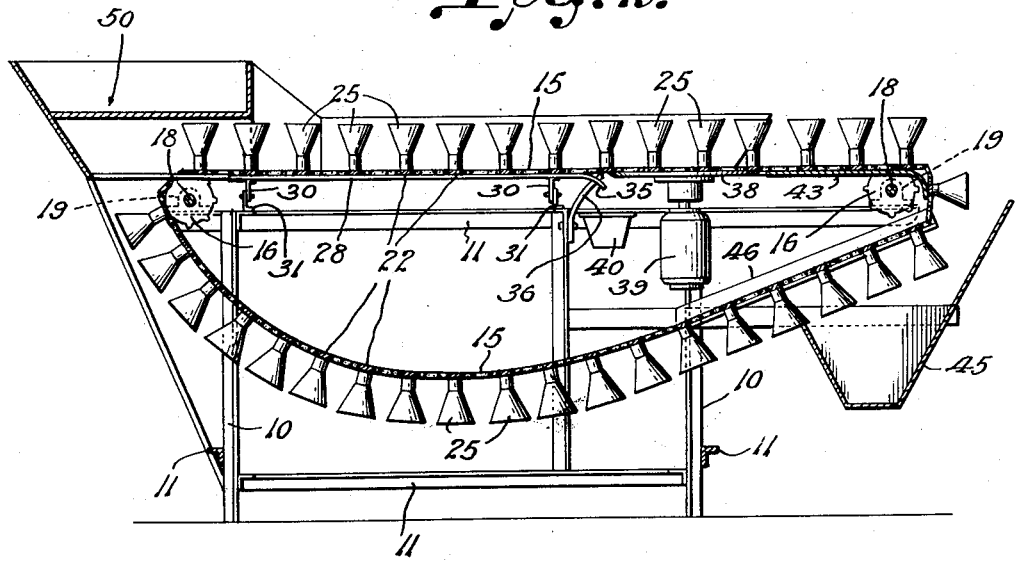
Figure 2 is a longitudinal vertical section of the apparatus shown in Figure 1.
Figure 3:
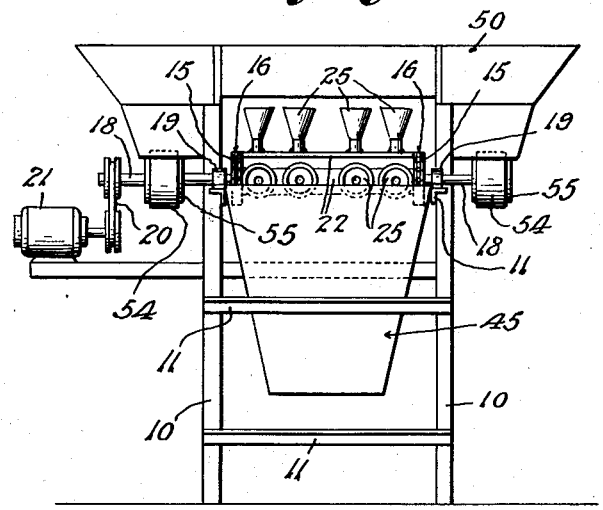
Figure 3 is an end elevation, viewed from the right hand end of Figures 1 and 2.
Figure 4:
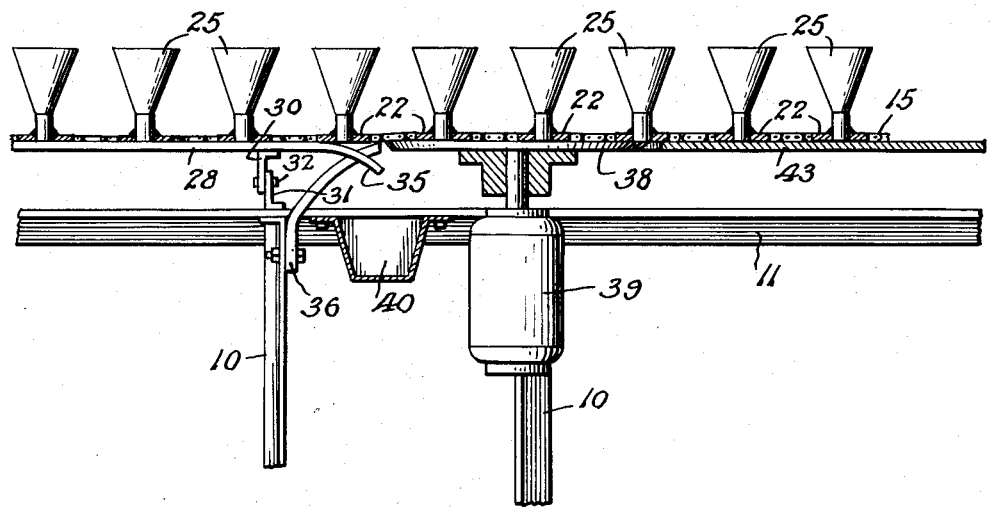
Figure 4 is an enlarged partial section of the structure shown in Figure 2.

Thus the conveyor is preferably of the continuous belt type constituted by a pair of chains 15 which are disposed at each side of the machine bed and extend lengthwise thereof, each chain being supported on and passing about sprocket wheels 16 disposed at opposite ends of the machine and suitably journalled on the machine frame. Thus, the sprocket wheels may be mounted on transverse shafts 18, journalled in bearings 19 carried by the machine frame, one of the shafts 18 being driven by belt gearing 20 from a motor 21. The disposition of sprocket wheels 16 is such, as shown in Figure 2, that the conveyor moves through an operative path comprising a generally horizontal upper run, and returns through an inoperative lower run. The two chains 15 of the conveyor are connected by transverse conveyor plates 22, the latter being spaced lengthwise of the conveyor as shown in Figure 1. Each plate 22 is mounted at its ends on the conveyor chains, for instance, by welding the plate to laterally projecting bosses or hubs 25 formed on the chain links.

Figure 5:
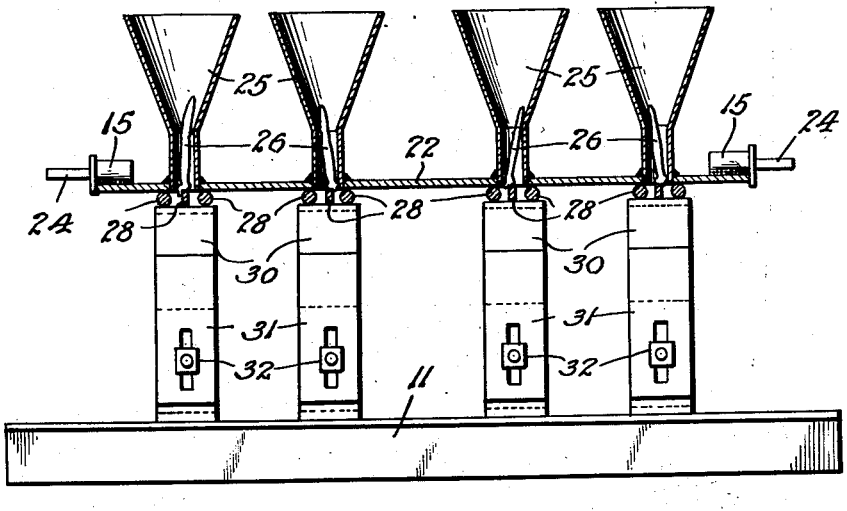
Figure 5 is an enlarged transverse sectional view of the containers and the product supporting means.
Figure 6:
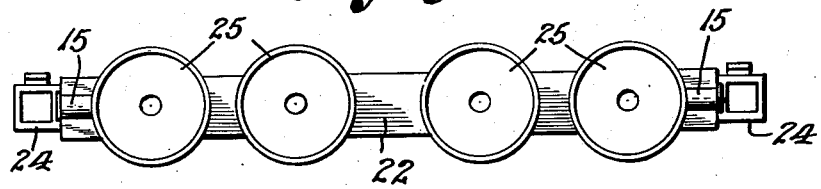
Figure 6 is a plan view of a transverse row of containers.
Figure 7:
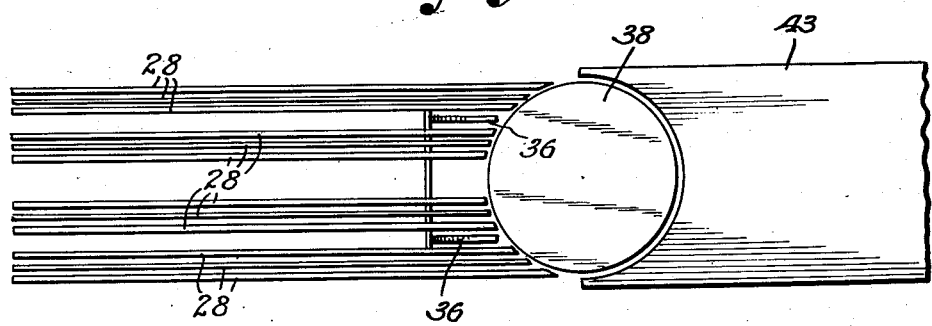
Figure 7 is a diagrammatic plan view of the product supporting means.

As shown in Figure 5, each transverse conveyor plate 22 is apertured at a plurality of spaced points to receive a corresponding number of containers 25, which are welded or otherwise rigidly secured within the apertures. Four such containers are illustrated in each transverse row, each container being preferably funnel-shaped to facilitate the introduction of the vegetable or other product 26 which is to be severed or sheared, and being open at both ends. The lower portion of each container 25 may be cylindrical, and has an internal diameter such that the product is received loosely therein and is permitted to pass freely therethrough, but is supported in the container in a generally upright position, with the head or stem of the product downward, by stationary means disposed beneath the upper operative run of the conveyor. The illustrated product 26 is the vegetable, okra, to the processing of which the invention is especially suited.

Preferably the stationary supporting means consists of a plurality of rods or bars 28 extending lengthwise of the conveyor. In the illustrated apparatus, there are a plurality of groups of bars 28, each group including three bars and extending lengthwise below each of the longitudinal files of containers, as shown in Figure 5. The bars 28 may be of any desired configuration in cross section, but as illustrated, the central bar of each group is rectangular and the two outer bars are circular in section, the latter engaging and supporting the transverse conveyor plates 22 over a substantial portion of the length of the operative run of the conveyor, as shown in Figure 2. The central bar of each group is positioned immediately below and centrally of the open lower end of the containers 25, so as to prevent discharge of the products from the containers. Each group of bars 28 is carried on a generally upright plate 30, which is in turn slidably mounted on a cooperating plate 31, being retained in vertically adjusted position thereon by a suitable locking device 32. The plates 31 are carried by transverse frame members 11. At their trailing ends, each bar 28 is curved downwardly as shown at 35 in Figure 2, and adjacent this point there is provided, in order to prevent contact between the conveyor and with the cutting device, about to be described, two or more supporting arms 36, suitably secured to adjacent members of the frame or bed and extending upwardly therefrom to engage and support the conveyor plates 22.

The cutting device may assume various forms, but preferably consists of a cutting blade 38 which is supported for rotation on a generally vertical axis, for instance by mounting the blade on the shaft of motor 39, which is carried by the machine bed. Blade 38 is thus disposed in a substantially horizontal plane beneath the upper operative run of the conveyor, so as to shear off the heads or stems of the products which, as they approach the cutting blade, depend beneath the containers 25 in which they are received.

The extent to which the products depend from the lower ends of the containers 25 may be altered by relative adjustment of the cooperating plates 30 and 31 which support the rods or bars 28. Thus as these rods or bars are raised or lowered, the curved trailing ends 35 thereof will be so altered in position with respect to the cutting edge of knife 38 as to determine the length of the product which is sheared by the latter. The sheared portion is discharged into a hopper 40 positioned beneath the leading edge of the knife. On leaving the supporting arms 36 the conveyor may be permitted to rest on and be supported by the upper face of knife 38 and by an apron 43 located beyond the knife and extending between the latter and toward and slightly beyond the sprocket wheels 16 at the discharge end of the machine. As the containers pass these sprocket wheels, and over the rear, downwardly curved ends of the apron 43, they are inverted so as to discharge the remainder of the product downwardly into a bin 45, that portion of the lower run of the conveyor immediately over the bin being engaged and supported by a structural member 46 carried by the machine frame.

It will be appreciated that the depth of cut performed on the product is altered by relative adjustment of the vertical position of the bars 28 and the cutting knife 38. It will also be appreciated that the extent to which the products depend from the lower ends of containers 25 is critical only as the products approach and engage the leading edge of the cutting blade 38, and that the bars 28 may therefore be of any desired configuration or disposition throughout the major portion of the length thereof. It is sufficient in the effective practice of the invention if, at the instant the products are brought against the cutting edge, the products are so positioned vertically that a desired length of product may be severed, and that some means is provided for varying the effective length of the severed portion.

The invention contemplates further the provision of any conventional automatic means for delivering products to the containers 25. However, in the preferred embodiment of the invention, the products are delivered manually. For convenience of operatives, the products may be supplied to a bin 50 disposed adjacent the leading end of the machine, from which they are discharged downwardly through suitable chutes onto a pair of longitudinally extending conveyors 54, the latter being moved in the direction of movement of the containers 25. Thus conveyors 54 may comprise belts which are passed over rollers at opposite ends of the machine, the rollers being mounted on the shafts 18 which carry the conveyor sprockets 16, so that the rollers 55 at the delivery end of the machine are positively driven from motor 21. The products are thus carried lengthwise of the machine so that they may be readily picked up and deposited in containers 25 by unskilled operators, with the heads or stems of the products downward.

It will be perceived that the invention comprises, in its essence, a continuous conveyor having thereon product containers which are open at the bottom, and which are dimensioned to receive the products loosely therein, fixed supporting means to prevent the discharge of the products from the lower ends of the containers, and a cooperating cutting device located immediately beyond the supporting means, the cutting device being so vertically positioned with respect to the supporting means as to sever a predetermined length of the conveyed product.

Having thus described the invention, what is claimed as new and desired to be secured by Letters Patent is:

In apparatus for slicing edible products, the combination with a conveyor, and a succession of transverse rows of funnel shaped containers carried by said conveyor for movement therewith in a generally upright position through a predetermined generally horizontal path, each container being open at the top and bottom and having lateral dimensions such as to permit free passage therethrough from top to bottom of a product of average size, stationary devices extending lengthwise of said predetermined path and positioned beneath said conveyor and said containers adjacent the bottoms of the latter to support said conveyor over part of its length, and to engage and prevent the discharge from said containers of products inserted in the latter, whereby a portion of each product may depend from the container in which it is received, a cutting blade supported for rotation on a substantially vertical axis for engaging and slicing the depending portion of each product, the lead portion of the cutting edge of said blade being positioned adjacent to and beyond the trailing end of said stationary devices, and means supporting said conveyor immediately adjacent the leading portion of said blade to prevent engagement of the conveyor and the cutting edge of the blade.

References Cited in the file of this patent

UNITED STATES PATENTS

| Number | Name | Date |
|---|---|---|
| 1,077,899 | Woodring | Nov. 4, 1913 |
| 1,116,930 | Schroder | Nov. 10, 1914 |
| 1,400,290 | Johannes | Dec. 13, 1921 |
| 1,503,612 | Taylor | Aug. 5, 1924 |
| 2,062,739 | Canadoy | Dec. 1, 1936 |
| 2,435,762 | Urschel | Feb. 10, 1948 |
| 2,503,975 | Sutton | Apr. 11, 1950 |